US009126569B2

(12) United States Patent
Schaeuble

(10) Patent No.: US 9,126,569 B2
(45) Date of Patent: Sep. 8, 2015

(54) WIPER BLADE FOR CLEANING VEHICLE WINDOWS

(71) Applicant: Valeo Systèmes d'Essuyage, Le Mesnil Saint Denis (FR)

(72) Inventor: Michael Schaeuble, Vaihingen/Enz (DE)

(73) Assignee: Valeo Systèmes d'Essuyage, Les Mesnil Saint Denis (FR)

( * ) Notice: Subject to any disclaimer, the term of this patent is extended or adjusted under 35 U.S.C. 154(b) by 227 days.

(21) Appl. No.: 13/953,994

(22) Filed: Jul. 30, 2013

(65) Prior Publication Data

US 2014/0026347 A1 Jan. 30, 2014

(30) Foreign Application Priority Data

Jul. 30, 2012 (DE) .......................... 10 2012 106 946

(51) Int. Cl.
*B60S 1/38* (2006.01)
*B60S 1/40* (2006.01)
(52) U.S. Cl.
CPC ................ *B60S 1/40* (2013.01); *B60S 1/3805* (2013.01); *B60S 1/3862* (2013.01); *B60S 1/3874* (2013.01); *B60S 1/3886* (2013.01); *B60S 2001/4054* (2013.01)
(58) Field of Classification Search
CPC ....... B60S 1/3862; B60S 1/524; B60S 1/3805
USPC .......................................... 15/250.01–250.09
See application file for complete search history.

(56) References Cited

U.S. PATENT DOCUMENTS

2003/0009841 A1* 1/2003 Sato ........................... 15/250.04

FOREIGN PATENT DOCUMENTS

DE 102008049269 * 4/2010 ................ B60S 1/40
DE 10 2010 025 687 A1 1/2012

* cited by examiner

*Primary Examiner* — Mark Spisich
*Assistant Examiner* — Andrew A Horton
(74) *Attorney, Agent, or Firm* — Osha Liang LLP

(57) ABSTRACT

The invention relates to a wiper blade (10) for cleaning vehicle windows, with a wiper blade body (22) connected with a wiper blade adapter (11), wherein the wiper blade adapter (11) consists of an adapter element (12) on the wiper arm side and of an adapter element (13) on the wiper blade side, which are connected with one another and are arranged pivotably with respect to one another in an axis (14), and with at least one distributor element (35) arranged pivotably in the axis (14) for the hydraulic and/or electrical supply of the wiper blade body (22), wherein the distributor element (35) is arranged substantially between two side walls (29, 30) of the adapter element (13) on the wiper blade side, that an aperture (31, 32) is formed respectively on the two side walls (29, 30) of the adapter element (13) on the wiper blade side aligned to the axis (14), and that the distributor element (35) has respectively a peg-like bearing extension (55, 56) on the side facing the side walls (29, 30).

8 Claims, 2 Drawing Sheets

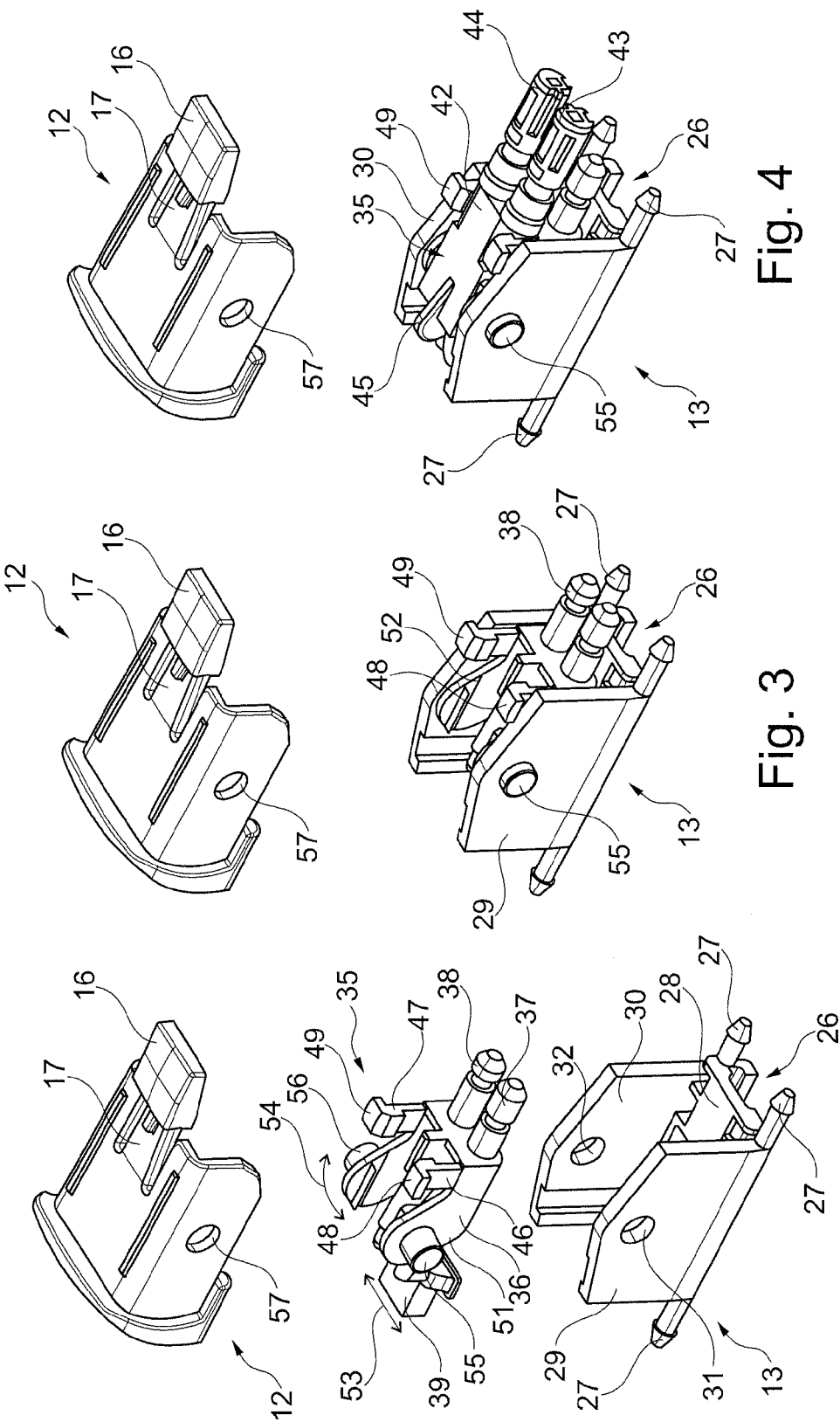

WIPER BLADE FOR CLEANING VEHICLE WINDOWS

PRIOR ART

Figure 1:
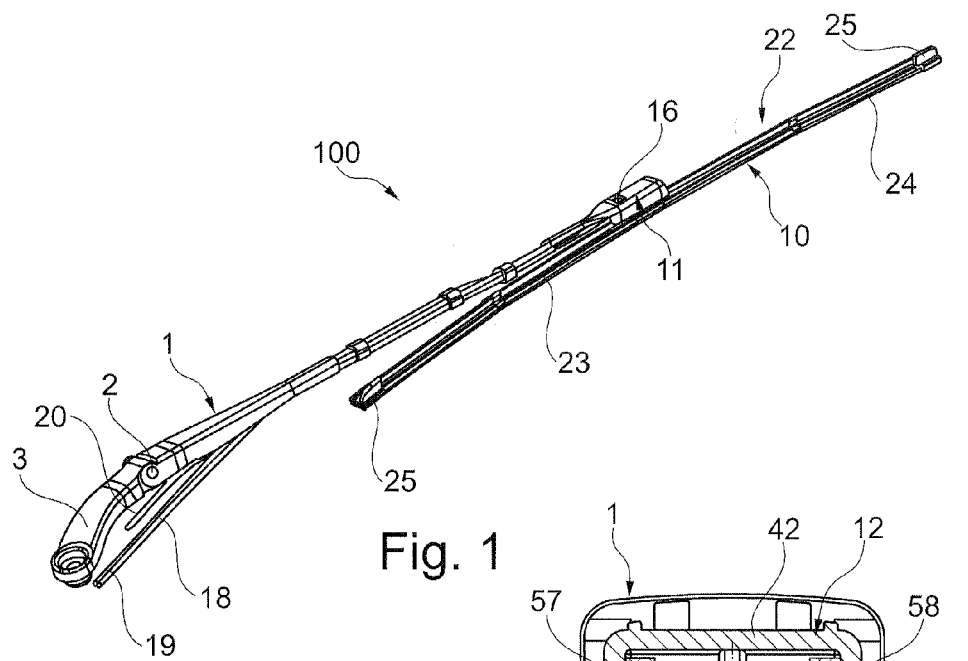

The invention relates to a wiper blade for cleaning vehicle windows, as per the preamble of claim 1.

A wiper blade of said type is known from the applicant's DE 10 2010 025 687 A1. In the design variant disclosed in FIGS. 7 and 8 of the cited document, the adapter element on the wiper blade side has two plate-like side walls, between which there is arranged a distributor element for the supply of washer fluid or for an electrical supply to a heating device of the wiper blade. Here, the two side walls have apertures into which extensions of the distributor element engage. On the side facing away from the distributor element, the extensions have bores into which, in turn, bearing pegs of the adapter element on the wiper arm side can engage in order to arrange the adapter element on the wiper arm side pivotably with respect to the adapter element on the wiper blade side. A disadvantage here is that the bearing points of the distributor element for the mounting of the distributor element in the apertures of the adapter element on the wiper blade side and for receiving the bearing pegs of the adapter element on the wiper arm side have a relatively low mechanical load capacity owing to the annular design with relatively small wall thickness.

DISCLOSURE OF THE INVENTION

Taking the presented prior art as a starting point, it is the object of the invention to further develop a wiper blade for cleaning vehicle windows as per the preamble of claim 1 in such a way as to permit mechanically loadable mounting of the distributor element in the adapter element on the wiper blade side and of the adapter element on the wiper arm side. Said object is achieved according to the invention, in the case of a wiper blade for cleaning vehicle windows having the features of claim 1, in that the bearing extensions are constructed so as to be circular, at least in parts, in cross-section, that the bearing extensions project beyond the respective side wall on the side facing away from the distributor element, and that the bearing extensions engage into respectively a recess of the adapter element on the wiper arm side. By means of the design of bearing extensions which are cylindrical in cross section, a mechanically robust mounting is made possible with an identical diameter of the bearing extensions in comparison with the annular design according to the prior art, wherein the bearing extensions can furthermore be produced in a relatively simple manner.

Advantageous refinements of the wiper blade according to the invention for cleaning vehicle windows are specified in the subclaims. The scope of the invention encompasses all combinations of at least two of the features disclosed in the claims, in the description and/or in the figures.

To permit simple mounting of the distributor element on the adapter element on the wiper blade side, it is proposed that the side walls of the distributor element are constructed so as to be elastically deformable in the region of the bearing extensions. In this way, for the mounting of the distributor element, it is necessary merely for the bearing extensions to be pushed toward one another until the width between the end faces, which face away from one another, of the bearing extensions is smaller than the width of the receptacle in the adapter element on the wiper blade side.

To protect the region of the mounting of the distributor element in the adapter element on the wiper blade side in particular with respect to an ingress of dirt, moisture or the like, it is provided in a further refinement of the invention that the region of the recesses on the adapter element on the wiper arm side is covered by the wiper arm.

During the pivoting of the wiper blade on the wiper arm, it is necessary for the two adapter elements of the wiper blade adapter to be pivoted relative to one another, wherein the distributor element should preferably be arranged in a positionally fixed manner with respect to the wiper arm or with respect to the adapter element on the wiper arm side. It is therefore provided in a further refinement that the distributor element and the adapter element on the wiper arm side are arranged in abutting contact with one another, such that, during a pivoting movement of the two adapter elements, the distributor element remains positionally fixed with respect to the adapter element on the wiper arm side.

In a preferred design refinement of the abutting contact, it is provided that the abutting contact is formed by three contact surfaces, which contact surfaces are formed by an elevation arranged on the distributor element and by two upper sides on detent tongues which lie against that surface of the adapter element on the wiper arm side which faces toward the distributor element.

In a further refinement which is preferred from a design aspect, it is provided that the distributor element consists of two connection bodies which are connected to one another by a detent connection, wherein the detent connection has two detent tongues.

Figure 6:
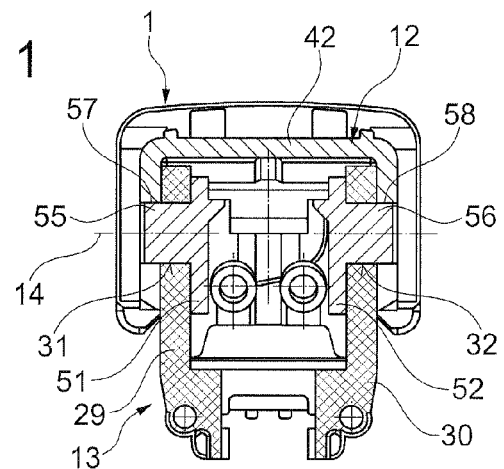
Figure 5:
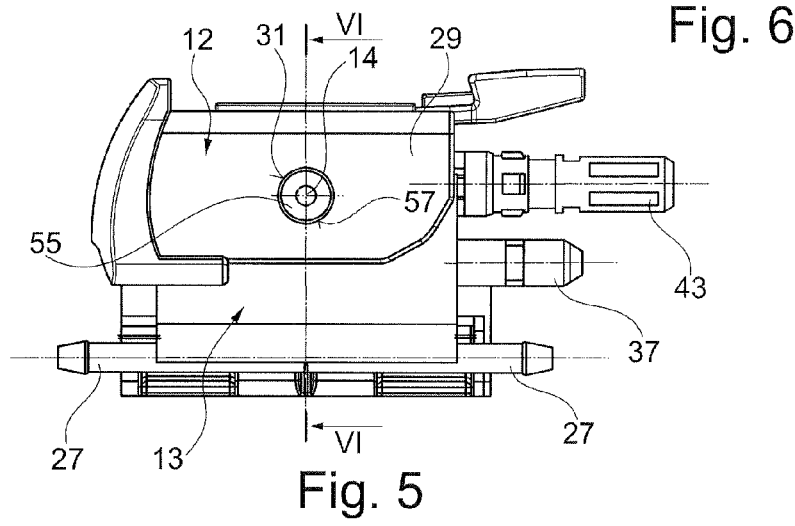

Further features, advantages and details of the invention will emerge from the following description of preferred exemplary embodiments, and on the basis of the drawing, in which:

FIG. 1 shows a wiper device having a wiper arm and having a wiper blade according to the invention fastened to the wiper arm, in a perspective view, FIG. 2 to FIG. 4 show, in an exploded illustration in each case, parts of the wiper blade adapter and of a distributor element during different mounting stages, FIG. 5 shows a side view of a wiper blade adapter, and FIG. 6 shows a section in the plane VI-VI in FIG. 5 in the case of a wiper blade adapter mounted on a wiper arm.

Identical elements or elements of identical function are denoted by the same reference numerals in the figures.

FIG. 1 illustrates a wiper device 100 for cleaning a vehicle window (not illustrated). The wiper device 100 comprises a wiper arm 1 having a wiper rod which is pivotably fastened via a wiper arm joint 2 to a bearing element 3. The bearing element 3 is in turn connected to a shaft of a wiper drive (not illustrated).

A wiper blade 10 according to the invention is fastened in an exchangeable manner to that end of the wiper arm 1 which faces away from the wiper arm joint 2. For this purpose, the wiper blade 10 has a wiper blade adapter 11 which is composed of an adapter element 12 on the wiper arm side and an adapter element 13 on the wiper blade side, said adapter elements being arranged pivotably with respect to one another in an axis 14 (FIGS. 5 and 6). The adapter element 12 on the wiper arm side has an actuating button 16 which is mounted elastically on a flexible tongue 17, wherein in the operating position of the wiper blade 10 illustrated in FIG. 1, in which the wiper blade 10 is fixedly connected to the wiper arm 1, the actuating button 16 engages in a positively locking manner, in a manner known per se, into a recess formed on the upper side of the wiper arm 1, so as to form a detent connection.

The wiper blade 10 has both a heating device (not illustrated in detail) and also an integrated washer device, for which purpose there are for example arranged in the wiper arm 1 two hose lines 18, 19 and an electrical line 20 which are connected, respectively, to a washer fluid tank and to the electrical supply of the motor vehicle.

The wiper blade 10 comprises inter alia a wiper blade body 22 which is composed of a wiper rubber 23 with a wiper lip 24 which bears against the vehicle window. In a conventional manner, on the longitudinal sides of the wiper rubber 23, there are arranged pre-bent spring rails (not illustrated in the figures) which serve for reinforcement in corresponding receptacles of U-shaped cross section. The wiper blade body 22 is closed off at its two end regions by means of caps 25.

As can be seen in particular from FIGS. 2 to 4, the adapter element 13 on the wiper blade side has, on its underside facing toward the wiper rubber 23, a receptacle 26 by way of which the adapter element 13 on the wiper blade side, in the manner of a rider, encompasses and fixes the spring rails together with the wiper rubber 23. It is also possible to see washer fluid connectors 27 which engage into corresponding washer fluid ducts of an additional element connected to the adapter element 13 on the wiper blade side. Spray openings (not illustrated) formed on the two opposite longitudinal sides of the wiper blade body 22 and/or of the additional element open out into the said washer fluid ducts.

The adapter element 13 on the wiper blade side has, proceeding from a base region 28, two plate-like side walls 29, 30 arranged parallel to one another. In the two side walls 29, 30 there is formed in each case one aperture 31, 32 of circular cross section, which aperture simultaneously defines or forms the axis 14.

Between the side walls 29, 30 of the adapter element 13 on the wiper blade side there is arranged a distributor element 35 which serves for providing the hydraulic and electrical supply. The distributor element 35 has a first connection body 36 which serves for the hydraulic supply to the washer fluid connector 27, which connection body 36 has connection pieces 37, 38 which are in turn connected to the hose lines 18, 19. A hydraulic connection plug 39 arranged on the side situated opposite the connection pieces 37, 38 of the first connection body 36 can be connected to the base region 28 of the adapter element 13 on the wiper blade side, in order to form a hydraulic connection between the connection piece 37, 38 and the washer fluid connector 27.

The first connection body 36 of the distributor element 25 is connected to a second connection body 42, which can be seen only in FIGS. 4 and 6. The second connection body 42 has two plug connections 43, 44 which are arranged parallel and above the connection piece 37, 38 and which in turn can be electrically contacted with the line 20. On the upper side of the second connection body 42 there is also integrally formed a hump-like elevation 45 which bears against the inner side of the wiper arm 1 when the wiper blade 10 is mounted on the wiper arm 1. The second connection body 42 is connected to the first connection body 36 by means of a detent connection. For this purpose, the first connection body 36 has two detent tongues 46, 47 which project in the direction of the second connection body 42 and which interact with corresponding cutouts on the second connection body 42 and which, in the connecting position illustrated in FIG. 4, form the said detent connection with the second connection body 42. In the assembled state of the wiper blade 10, the planar upper sides 48, 49 of the detent tongues 46, 47 form, together with the elevation 45, three contact surfaces which are arranged in abutting contact with the inner side of the wiper arm 1, such that the distributor element 35 is positioned and/or fixed with respect to the wiper arm 1. The spring tongue 17 and the actuating button 16 are arranged between the two detent tongues 46, 47.

The second connection body 42 is received between side arms 51, 52 of the first connection body 36. The side arms 51, 52 are arranged so as to be resilient in the direction of the double arrows 53, 54. On the sides, which face away from one another, of the side arms 51, 52, the side arms 51, 52 have peg-like bearing extensions 55, 56 which are integrally formed thereon and which have a circular cross section. In the mounted state of the distributor element 35 corresponding to FIGS. 3 and 4, the bearing extensions 55, 56 extend through the apertures 31, 32 of the side walls 29, 30 of the adapter element 13 on the wiper blade side such that the bearing extensions 55, 56 project beyond the side walls 29, 30 of the adapter element 13 on the wiper blade side on the side facing away from the distributor element 35. Those portions of the bearing extensions 55, 56 which project beyond the side walls 29, 30 serve for the pivotable mounting of the adapter element 12 on the wiper arm side, for which purpose the latter has recesses which are formed in alignment with the bearing extensions 55, 56 and which are formed as through-openings 57, 58.

The mounting of the wiper blade adapter 11 and of the distributor element 35 is, corresponding to FIGS. 2 to 4, as follows: Firstly, in a first step, by virtue of the two side arms 51, 52 being pressed together, the first connection body 36 is fastened to the adapter element 13 on the wiper arm side by virtue of the bearing extensions 55, 56 being arranged in the apertures 31, 32. Subsequently, corresponding to FIG. 4 (if this has not already taken place in a preceding manufacturing step, the second connection body 42 may be connected to the first connection body 36 by means of the said detent connection. Finally, the adapter element 12 on the wiper arm side is connected to the adapter element 13 on the wiper blade side by virtue of the through-openings 57, 58 in the side walls of the adapter element 12 on the wiper arm side being placed in operative connection with those portions of the bearing extensions 55, 56 which project out of the side walls 29, 30 of the adapter element 13 on the wiper blade side. The wiper blade adapter 11 pre-assembled in this way may for example subsequently be connected to the other parts of the wiper blade 10.

The mounting of the wiper blade 10 on the wiper arm 1 takes place by pushing the wiper blade adapter 11 into the open (U-shaped) cross section of the wiper arm 1 in the connecting region, wherein the actuating button 16 forms the detent connection with the recess of the wiper arm 1. When the wiper blade 10 is in the mounted state on the wiper arm 1, the region of the bearing extensions 55, 56 is covered by the side walls of the wiper arm 1.

The wiper blade 10 thus described may be altered or modified in a variety of ways without departing from the concept of the invention. In particular, it is conceivable to use a single-piece distributor element 35 instead of a distributor element 35 composed of the two connection bodies 36, 42. It also falls within the scope of the invention, for example, to dispense with a heating device or a washer device. It is essential merely that a distributor element 35 is provided which, by way of its bearing extensions 55, 56, serves for the mounting of the adapter element 12 on the wiper arm side.

LIST OF REFERENCE NUMERALS

1 Wiper arm
2 Wiper arm joint
3 Bearing element

10 Wiper blade
11 Wiper blade adapter
12 Adapter element on the wiper arm side
13 Adapter element on the wiper blade side
14 Axis
16 Actuating button
17 Flexible tongue
18 Hose line
19 Hose line
20 Line
22 Wiper blade body
23 Wiper rubber
24 Wiper lip
25 Cap
26 Receptacle
27 Washer fluid connector
28 Base region
29 Side wall
30 Side wall
31 Aperture
32 Aperture
35 Distributor element
36 Connection body
37 Connection piece
38 Connection piece
39 Hydraulic connection plug
42 Connection body
43 Plug connection
44 Plug connection
45 Elevation
46 Detent tongue
47 Detent tongue
48 Upper side
49 Upper side
51 Side arm
52 Side arm
53 Double arrow
54 Double arrow
55 Bearing extension
56 Bearing extension
57 Through-opening
58 Through-opening
100 Wiper device

The invention claimed is:

1. A wiper blade for cleaning vehicle windows, comprising:
   a wiper blade body connected with a wiper blade adapter, wherein the wiper blade adapter includes an adapter element on the wiper arm side and an adapter element on the wiper blade side, which are connected with one another and are arranged pivotably with respect to one another in an axis; and
   at least one distributor element arranged pivotably in the axis including a connecting device coupled to a hydraulic and/or electrical supply of the wiper blade body,
   wherein the distributor element is arranged substantially between two side walls of the adapter element on the wiper blade side, that an aperture is formed respectively on the two side walls of the adapter element on the wiper blade side aligned to the axis, and that the distributor element has respectively peg-like bearing extensions on sides facing the side walls,
   wherein the bearing extensions are constructed to be circular, at least in parts, in cross-section, the bearing extensions project over the respective side wall on the side facing away from the distributor element, and the bearing extensions engage into respective recesses of the adapter element on the wiper arm side.

2. The wiper blade according to claim 1, wherein side sections of the distributor element are constructed so as to be elastically deformable in the region of the bearing extensions.

3. The wiper blade according to claim 1, wherein the recesses are constructed as through-openings on the adapter element on the wiper arm side.

4. The wiper blade according to claim 1, wherein the region of the recesses on the adapter element on the wiper arm side is covered by a wiper arm.

5. The wiper blade according to claim 1, wherein the distributor element and the adapter element on the wiper arm side are arranged in abutting contact to one another, so that on a pivoting movement of the adapter element on the wiper blade side, the distributor element is arranged fixedly to the adapter element on the wiper arm side.

6. The wiper blade according to claim 5, wherein the abutting contact is formed by three contact surfaces which lie against the surface of the adapter element on the wiper arm side facing the distributor element.

7. The wiper blade according to claim 6, wherein the distributor element consists of two connection bodies, which are connected with one another by a detent connection, the detent connection has two detent tongues, which are arranged at lateral regions of the one connection body, the detent tongues form two contact surfaces with their upper sides, and the third contact surface is formed by an elevation on the distributor element.

8. The wiper blade according to claim 7, wherein the adapter element on the wiper arm side has an actuating button arranged on a flexible tongue, and that at least the flexible tongue is arranged between the detent tongues.

* * * * *